No. 880,431. PATENTED FEB. 25, 1908.
W. S. WATSON.
AUTOMATIC BUTTON CUTTING AND SHAPING MACHINE.
APPLICATION FILED JULY 3, 1906.
2 SHEETS—SHEET 1.
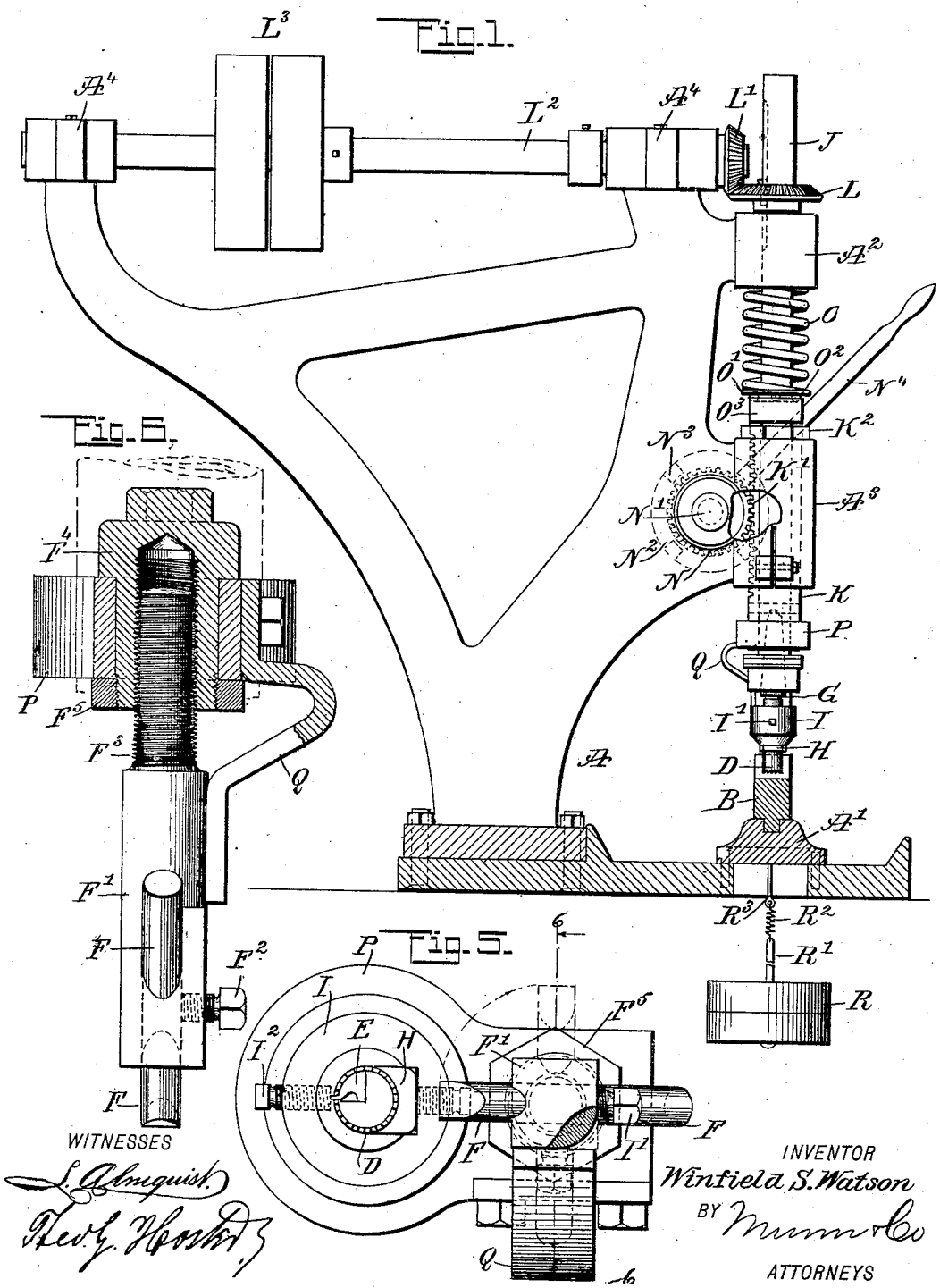
WITNESSES
INVENTOR
Winfield S. Watson
BY Munn & Co
ATTORNEYS

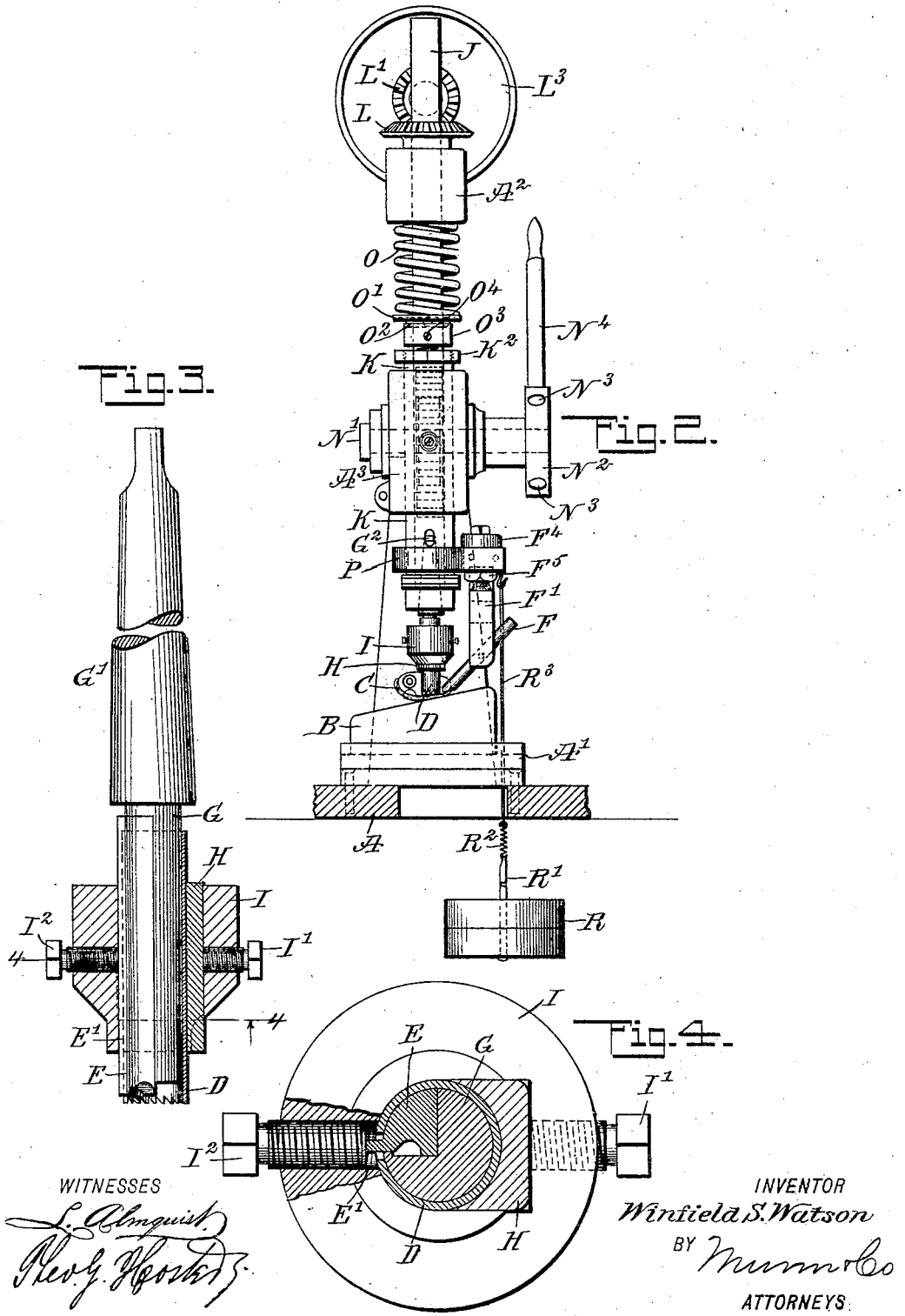

UNITED STATES PATENT OFFICE.

WINFIELD S. WATSON, OF MEMPHIS, TENNESSEE.

AUTOMATIC BUTTON CUTTING AND SHAPING MACHINE.

No. 880,431. Specification of Letters Patent. Patented Feb. 25, 1908.

Application filed July 3, 1906. Serial No. 324,643.

*To all whom it may concern:*

Be it known that I, WINFIELD S. WATSON, a citizen of the United States, and a resident of Memphis, in the county of Shelby and State of Tennessee, have invented a new and Improved Automatic Button Cutting and Shaping Machine, of which the following is a full, clear, and exact description.

The invention relates to the art of making buttons, such as shown and described in the application for Letters Patent of the United States, No. 250,559, filed by me March 17, 1905, and its object is to provide a new and improved automatic button cutting and shaping machine, arranged to accurately cut the button to the desired thickness and at the same time face the button properly, and while automatically and securely holding the shell in proper position to permit of using the shell economically, at the same time producing buttons of high quality.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement, parts being shown in section; Fig. 2 is a front elevation of the same, the base being shown in section; Fig. 3 is an enlarged sectional elevation of the tubular cutter and facing tool; Fig. 4 is an enlarged inverted plan view of the same on the line 4—4 of Fig. 3; Fig. 5 is an enlarged inverted plan view of the barrel, the tubular cutter, the shell holder, and the support for the shell holder, part being broken out; and Fig. 6 is a transverse section of the same on the line 6—6 of Fig. 5.

On a suitably constructed frame A is arranged a guideway A' for supporting a shell supporting block B slidable thereon in a transverse direction, the said shell supporting block B having an inclined top on which is placed the shell C acted on by a tubular cutter or saw D, and a facing tool E, to cut the shell to a desired depth and to face the top portion of the cut portion. The shell C is held in place on the top of the block B during the cutting and facing operation, by a shell holder F engaging the upper face of the shell adjacent to the tubular cutter D and on the side towards the tip of the shell, as plainly indicated in Fig. 2. The tubular cutter D is provided at its lower edge with suitable cutting teeth, and the said cutter is split lengthwise and fitted onto a shank G to which the cutter is clamped by a clamping block H held in a collar I on the tubular cutter D, as plainly illustrated in the drawings. A set screw I' screwing in the collar I and against the block H, serves to move the latter in contact with the tubular cutter D at a point diametrically opposite the split of the cutter, as plainly indicated in Fig. 4. The facing tool E is set in a recess in the shank G and is provided with a lengthwise extending rib E' passing through the split of the tubular cutter D, and engaged by a set screw $I^2$ screwing in the collar I. Thus by the arrangement described, the tubular cutter D is securely fastened to the shank G and the facing tool E is secured to the shank and can be adjusted in the length of the shank G, to bring the lower or cutting edge of the facing tool the desired distance from the teeth of the tubular cutter D.

The shank G is provided with a conical head G' fitting into a correspondingly shaped socket in a spindle J and secured thereto by a key $G^2$, the said spindle J being mounted to turn and to slide vertically near its upper end in a bearing $A^2$, and near its lower end in a barrel K mounted to slide up and down in a bearing $A^3$ formed or secured on the main frame A. A bevel gear wheel L is mounted to turn with and slide on the upper end of the spindle J, and the said bevel gear wheel L is in mesh with a bevel gear wheel L' secured on a shaft $L^2$ journaled in suitable bearings $A^4$ arranged on the main frame A. On the shaft $L^2$ are arranged fast and loose pulleys $L^3$ connected by belt with other machinery, for imparting a continuous rotary motion to the shaft $L^2$ which by the bevel gear wheels L' and L rotate the spindle J and consequently the shank G, the tubular cutter D and the facing tool E. A spring O serves to feed the spindle J in a downward direction, and the said spring O is coiled on the spindle J, and rests with one end on the under side of the bearing $A^2$ and abuts with its other end on a washer O' resting on a ball bearing $O^2$ carried by a collar or nut $O^3$ screwing on the spindle J, and adapted to be secured thereto by a set screw $O^4$. The tension of the spring O is regulated by adjusting the collar $O^3$.

The barrel K is provided with a rack K' in mesh with a gear wheel N mounted to turn on a shaft N' journaled in suitable bearings arranged on the main frame A, and on the said shaft N' is secured a wheel $N^2$ provided in its peripheral face with spaced apertures $N^3$, any one of which is adapted to be engaged by a hand lever $N^4$ under the control of the operator, to permit the latter to turn the shaft N' and consequently the gear wheel N, to impart an up and down sliding motion to the barrel K. The upper end of the latter is provided with a nut $K^2$ adapted to limit the downward sliding motion of the barrel K on abutting against the top of the bearing $A^3$, the nut $K^2$ serving as a seat for the collar $O^3$ to turn on when the cut or kerf in the shell has reached the desired depth.

The shell holder F is preferably in the form of a rod mounted to slide in a carrier F' and adapted to be secured thereto by a set screw $F^2$, and the said carrier F' has its upper reduced end $F^3$ screw-threaded and screwing in a quill or nut $F^4$ mounted to turn in a bracket P bolted or otherwise secured to the lower end of the barrel K. A jam nut $F^5$ on the lower end of the nut $F^4$ serves to securely fasten the nut in position on the bracket P after the shell holder F is set. In order to prevent the carrier F' from turning accidentally a retaining spring Q is provided, secured to the bracket P and resting with its free end on one side of the carrier F'. By the arrangement described the carrier F' may be given a quarter turn as the spring Q permits such movement, but the carrier F' and consequently the shell holder F are held against accidental turning movement by the spring Q. On loosening the jam nut $F^5$ and turning the nut $F^4$, the carrier F' and consequently the shell holder F can be raised or lowered to the minutest degree to suit existing conditions, that is, to bring the shell holder in proper relation relative to the cutter D for the latter to cut the desired depth into the shell resting on the inclined top of the supporting block B.

It is expressly understood that the depth of the annular cut or kerf made by the cutter D, depends wholly on the distance the cutter D projects below the free end of the shell holder F. Now when the collar $O^3$ is seated on the top of the collar $K^2$, see Fig. 1, and the set screw I' is loosened, then the cutter D can be moved up or down until the bottom of the cutter D is a distance from the bottom of the shell holder F, corresponding to the depth of the cut or kerf to be made in the shell C by the cutter D. When this has been done the operator screws up the set screw I' to lock the cutter in place on the shank G. If a further and more minute adjustment is required between the cutter D and the shell holder F, the operator loosens the nut $F^5$ and then turns the nut $F^4$ in the bracket P (see Fig. 6) to raise or lower the shell holder F. If for any reason and while the machine is in use, a cut of more or less depth is desired, then the operator by turning the nut $F^4$ can make the desired adjustment without requiring adjustment of the cutter D on the shank G. A weight R is hung by a rod R' on a spring $R^2$ connected by a hook $R^3$ with the bracket P, to insure a ready downward movement of the barrel and the shell holder F, to hold the latter with sufficient force in contact with the shell C to prevent rotation thereof during the cutting operation.

The operation is as follows: The operator in swinging the handle $N^4$ upward causes the barrel K to slide upward in its bearing $A^3$, and the barrel in rising carries along the spindle J by the nut or collar $K^2$ engaging the collar $O^3$. The cutter D is thus lifted sufficiently high above the top of the shell supporting block B, to permit the operator to place a shell in position on the supporting block B immediately below the cutter D and the shell holder F. The operator now swings the handle $N^4$ downward, to lower the barrel K and with it the shell holder F, for the latter to engage the shell adjacent to the cutter D now pressed downward into contact with the shell by the action of the spring O, it being understood that on lowering the barrel K its collar $K^2$ moved downward and away from the spindle collar $O^3$. As the cutter D rotates, it cuts into the shell until the collar $O^3$ engages the collar $K^2$, as the downward feeding of the spindle J by its spring O ceases as soon as the collar $O^3$ rests itself on the collar $K^2$. According to my method described in the application above referred to, it is only desirable to cut an annular kerf into the shell material and to grind off the back of the shell, for severing the button part bounded by the kerf from the shell, and by the arrangement herein shown and described the depth of the kerf can be determined to the minutest degree. The facing tool E in its downward movement with the cutter turns the face of the button.

From the foregoing it will be seen that the cutter D is yieldingly and automatically fed into the shell material by the action of the spring O, and the pressure with which the shell holder F is held in contact with the shell C is wholly independent of the said spring O and is governed by the weight R and that of the barrel K. By engaging the shell holder F with the shell adjacent to the cutter D and on the side of the kerf towards the tip of the shell permits of placing the cutter D close up to the hinge of the shell, thereby permitting of cutting more buttons out of a single shell, at the same time providing a smooth surface for the point of the shell holder F to rest on.

As is well known, sharp tools cut faster than dull ones, and in order to produce regularity in cutting when the cutter D becomes gradually duller it is only necessary to shift the supporting block B in its guideway A' so that a higher position of the inclined top of the said block B is immediately below the cutter D and the shell holder F, and hence the cutter D and its spindle J are held higher up and the tension of the spring O is increased to press the cutter D with more force into the material of the shell. Thus the supporting block B serves to increase the tension of the spring O and the pressure of the cutter D on the shell.

Having thus described my invention, I claim as new and desire to secure by Letters Patent:

1. An automatic button cutting and shaping machine, comprising a revoluble tubular cutter, a shell holder for engaging the shell at one side of the cutter only, means for adjusting the cutter and the shell holder relative to each other, to determine the depth of the kerf made by the cutter into the shell by the distance the cutter projects below the shell holder, manually controlled means for simultaneously raising both the cutter and the said shell holder, and means for moving the shell holder downward independent of the cutter.

2. An automatic button cutting and shaping machine, comprising a spring pressed cutter spindle mounted to slide and turn, a sliding member on the spindle, a shell holder carried by the sliding member, means for operating the sliding member, and means whereby when the sliding member is raised the spindle will be raised and its spring put under tension, thereby permitting the spindle to be forced downward by said spring when the sliding member is lowered.

3. An automatic button cutting and shaping machine, comprising a sliding and manually controlled barrel, a spindle mounted to turn and to slide in the said barrel, a tubular cutter held on the said spindle, and a shell holder carried by the said barrel.

4. An automatic button cutting and shaping machine, comprising a sliding and manually controlled barrel, a spindle mounted to turn and to slide in the said barrel, a tubular cutter held on the said spindle, a shell holder carried by the said barrel, and a feed spring pressing the said spindle to feed the said cutter automatically into the shell material.

5. An automatic button cutting and shaping machine, comprising a sliding and manually controlled barrel, a spindle mounted to turn and to slide in the said barrel, a tubular cutter held on the said spindle, a shell holder carried by the said barrel, and means to regulate and limit the sliding motion of the said spindle in the said barrel.

6. An automatic button cutting and shaping machine, comprising a sliding and manually controlled barrel, a spindle mounted to turn and to slide in the said barrel, a tubular cutter held on the said spindle, a shell holder carried by the said barrel, a feed spring pressing the said spindle to feed the said cutter automatically into the shell material, and means on the spindle and coacting with the barrel to limit the downward movement of said spindle.

7. An automatic button cutting and shaping machine, comprising a support, a spindle mounted to turn and to slide in the said support, a tubular cutter held on the said spindle, a shell holder, a feed spring pressing the said spindle to feed the said cutter automatically into the shell material, and a support for the shell and having an inclined top movable transversely relative to the cutter and holder to regulate the tension of the said spring.

8. An automatic button cutting and shaping machine, comprising a support, a spindle mounted to turn and to slide in the said support, a tubular cutter held on the said spindle, a shell holder, a feed spring pressing the said spindle to feed the said cutter automatically into the shell material, a bed having guideways, and a shell supporting block slidable in the said guideways and having an inclined top for the shell to rest on.

9. An automatic button machine, provided with a barrel adapted to be raised and lowered, a shell holder, and an axially and vertically adjustable carrier for the said holder carried by the said barrel.

10. An automatic button machine, provided with a barrel adapted to be raised and lowered, a shell holder, a carrier for the said holder and adjustably attached to the said barrel, and a retaining spring supported by the said barrel and having its free end engaging a side of the said carrier.

11. An automatic button cutting and shaping machine, comprising a sliding and manually controlled barrel, a spindle mounted to turn and to slide in the said barrel, a tubular cutter held on the said spindle, a shell holder carried by the said barrel, and a weight connected with the said barrel.

12. An automatic button machine, comprising a main frame, a barrel slidable on the said main frame, manually controlled means for imparting a sliding motion to the said barrel, a driven spindle mounted to turn and to slide in the said barrel, a spring pressing the said spindle, means for regulating the sliding motion of the said spindle relative to the said barrel, a tubular cutter and facing tool carried by the said spindle, and a shell holder adjustably supported by the said barrel.

13. In a button machine, a support having bearings, a barrel slidably mounted in one bearing of the support, a spring pressed spindle mounted to slide and turn in the barrel and the other bearing of the support and provided with a collar adapted to engage the upper end of the barrel to limit the downward movement of the spindle, a cutter carried by the spindle, a shell holder carried by the barrel, and means for operating the barrel.

14. In a button machine, a support, a barrel slidably mounted in the support, a spindle mounted to slide and turn in the barrel, a cutter on the spindle, and a shell holder carried by the barrel and adapted to engage the shell at one side of the cutter.

15. In a button machine, a support, a barrel slidably mounted in the support, a spindle mounted to slide and turn in the barrel, a cutter carried by the spindle, a carrier carried by the barrel, a shell holder in the carrier, and means for operating the barrel.

16. In a button machine, a support, a barrel slidably mounted in the support, a spindle mounted to slide and turn in the barrel, a cutter carried by the spindle, a carrier, a shell holder adjustably mounted in the carrier, means for adjustably securing the carrier to the barrel, and means for operating the barrel.

17. In a button machine, a support, a barrel adjustably mounted in the support, a spindle mounted to slide and turn in the barrel, a cutter carried by the spindle, a bracket carried by the barrel, a nut mounted in the bracket, a carrier having a screw threaded end engaging the nut, and a shell holder mounted in the carrier.

18. In a button machine, a support having bearings, a barrel mounted to slide in one of the said bearings and provided with a rack and with a collar at its upper end, a gear wheel meshing with the rack on the barrel, means for operating the gear wheel, a spindle mounted to slide and turn in the barrel and the other bearing of the support and provided with a collar above the collar of the barrel, a spring upon the spindle between the collar thereof and the upper bearing of the support, and a cutter on the lower end of the spindle.

19. In a button machine, a sliding and revoluble spindle, a tubular cutter carried by the spindle, a shell holder in the form of a bar and extending down at one side of the cutter so as to engage the tip of the shell, means for supporting the shell holder from the spindle to permit of relative movement between the spindle and holder, whereby the spindle is free to slide to advance the cutter after the holder has engaged the shell, and means for adjusting the cutter and shell holder relatively to each other.

20. In a button machine, a spindle mounted to turn and slide, a cutter carried by the spindle, a support for the shell below the cutter and having an inclined upper face, a holder for engaging the shell adjacent to the cutter and at the side towards the tip of the shell, and means for supporting the holder from the spindle to permit of relative movement between the spindle and holder, whereby the spindle is free to slide to advance the cutter after the holder has engaged the shell.

21. In a button machine, a revoluble tubular cutter, a shell support below the cutter and having an inclined upper face, and a holder for engaging the tip of the shell to hold its inner surface approximately horizontal to insure a proper cutting of the shell.

22. In a button machine, a movable member having a lateral projection, a nut mounted to turn in the projection of said member, a carrier having a screw threaded end engaging the nut, and a shell holder carried by the carrier.

In testimony whereof I have signed my name to this specification in the presence of two subscribing witnesses.

WINFIELD S. WATSON.

Witnesses:
A. R. YORK,
E. E. MICHAEL.